March 18, 1969  S. TEUCHER ET AL  3,433,490

FLAT GASKET

Filed Nov. 14, 1967

Inventors:
Siegfried Teucher &
Hans Kling

By Spencer & Kaye
Attorneys

United States Patent Office 3,433,490
Patented Mar. 18, 1969

3,433,490
FLAT GASKET
Siegfried Teucher, Burscheid, and Hans Kling, Cologne-Lindenthal, Germany, assignors to Goetzewerke Friedrich Goetze A.G., Burscheid, Germany
Filed Nov. 14, 1967, Ser. No. 682,849
Claims priority, application Germany, Nov. 14, 1966, G 48,440
U.S. Cl. 277—164       7 Claims
Int. Cl. F16j 15/00, 9/06; F02f 5/00

ABSTRACT OF THE DISCLOSURE

A flat gasket such as a cylinder head gasket having a design which increases the compressive pressure on the gasket material without necessitating an increase in the total compressive force. The cylinder head gasket embodiment of the present invention includes narrow strips of gasket material surrounding the engine cylinder openings as well as the coolant and/or lubricant openings. No material is present, however, in the immediate neighborhood of the openings for receiving the cylinder head bolts. The gasket material around the cylinder openings preferably comprises a metallic sheath having a C-shaped cross-sectional configuration and a spring member within the sheath which renders it resilient. The gasket material surrounding the coolant and/or lubricant channel openings is preferably made of a relatively soft resilient material such as asbestos and is preferably attached to the metallic sheath or sheaths to form a one-piece gasket.

Background of the invention

The present invention relates to a flat gasket, and, more particularly, to a cylinder head gasket for sealing the coolant and or lubricant channels as well as the cylinders between the cylinder head and the engine block of an internal-combustion engine.

The manufacture and use of gaskets, made of a combination of a soft, resilient material and a metal, to seal the cylinders and the coolant and/or lubricant channels between the cylinder head and the engine block of an internal-combustion engine is commonly known in the art. Such gaskets often include a soft material, e.g., of asbestos fibers, which is provided with a metallic support. A metallic border on the gasket rim closing off the cylinder opening is also included to avoid destruction of the soft edge of the gasket due to the high expansion pressure and to increase the specific contact pressure between the gasket edge and the associated engine part.

To improve the seal on the cylinders of an internal-combustion engine a gasket has been developed which consists substantially of an annular, closed sheath of C-shaped cross-section enclosing the cylinder opening and a spring element, inserted between the two arms of the sheath, including a number of individual springs. Such a gasket is disclosed in a copending application Ser. No. 631,679, filed on Apr. 18, 1967, for a "Gasket." This gasket has the advantage that it adapts very well to unevennesses in the sealing surface which is caused by static or thermal warping and the like and that it can follow the pulsating movements of the sealing gap which are caused by the continuous fluctuations in pressure and temperature between the cylinder head and engine block.

It is further known to combine a gasket of the above-described type with the gaskets that combine a soft, resilient material and a metal. Spring elements, such as an annular coil spring, here are also inserted into the metallic border of the gasket rim adjacent to the cylinder. Such a gasket is described in a copending application ser. No. 550,341, filed on May 16, 1966, for a "Sealing Arrangement."

It has been possible to obtain the best sealing effects to date with this type of cylinder head gasket. A prerequisite therefor, however, has been relatively high compressional forces and thus high contact pressures on the gasket material, particularly in the area of the cylinder enclosures. Unfortunately, it is not possible to substantially increase the compressional forces of the cylinder head bolts in present-day engines, particularly in engines having light-metal components, without running the risk that the bolt threads will strip. Compressional forces which are too small, however, leave the gasket susceptible to vibrations and often lead to premature breaks due to continued vibrations in the sheath as well as in the inserted springs.

Summary of the invention

It is therefore the object of the present invention to increase the specific gasket surface contact pressure, particularly in the area of the gasket rim which encloses the cylinders, without increasing the compressional forces, which are determined by the construction of an engine, and to thus reduce the susceptibility of the gasket to vibration.

This and other objects which will become apparent in the discussion that follows are achieved, according to the present invention, in that the coolant and/or lubricant channels are alone enclosed by relatively soft, flexible gasket material and the cylinders sealed by a gasket sheath having a C-shaped cross section and an inserted spring element. The area in the neighborhood of the openings for the machine screws is not surrounded by gasket material at all.

The configuration, according to the present invention, increases the compressional pressure on the gasket material around the sealed openings when the cylinder head is attached to the engine block with the gasket positioned thereinbetween. The arrangement results in a favorable distribution of the compressional forces created by the cylinder head screws and in a reduced absolute vibration range for the sealing gap. This advantage particularly applies to the gasket portion which encloses the cylinders; the susceptibility of this portion to vibrations can be considerably reduced by a high contact pressure.

In a further embodiment of the present invention the individual strips of gasket material which enclose the coolant and/or lubricant channels are combined into a unitary structure by means of bridge strips in order to facilitate handling during manufacture and installation. For the sake of simplicity, the bridges consist of the same material as the individual strips of gasket material which they connect.

The purely metallic cylinder seal can be held and centered by a plurality of lugs extending from the soft sealing material. The lugs are preferably precompressed to eliminate their influence on the sealing effectiveness.

To avoid unnecessary cutting or stamping of the soft material of the cylinder head gasket, it is further proposed that the gasket surfaces contacted only on one side by other holes present in the cylinder block or head be retained in a manner known in the art. The narrow strips of gasket material according to the present invention are sufficient to seal these other holes. The retained gasket surfaces, which are contacted on one side by the coolant and/or lubricant in these other holes, do not effect the contact pressure of the gasket. Since there is no counterforce pressing on these portions of the gasket when the cylinder head screws are tightened, they can escape into the other holes without decreasing the force on the gasket per unit area.

Description of the preferred embodiments

Figure 1:
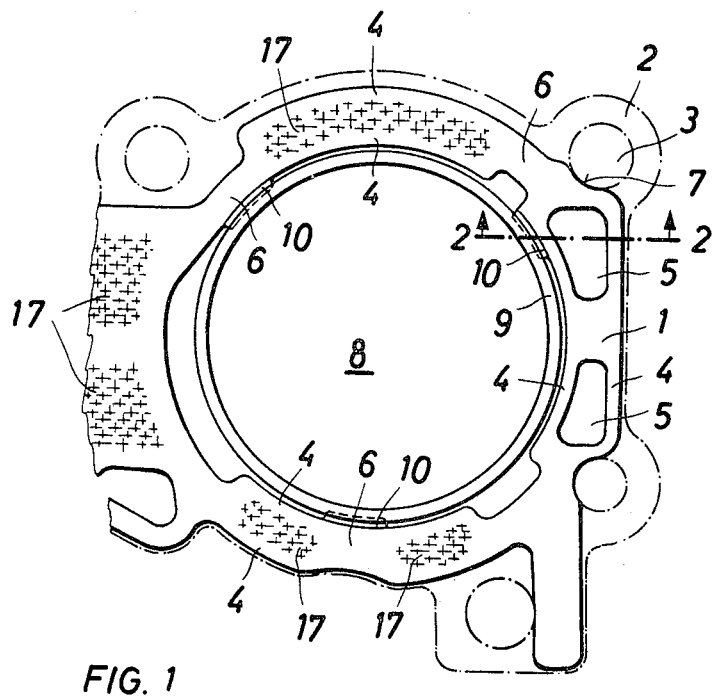
FIGURE 1 is a plan view of one-half of a cylinder head gasket for a water-cooled four-cylinder V-type engine.

One embodiment of the flat gasket according to the present invention is the cylinder head gasket designated by the reference numeral 1 in FIGURE 1.

The outline 2 shown in dashed lines indicates the conventional construction of a cylinder head gasket which encloses the openings 3 for receiving machine bolts in addition to the areas to be actually sealed. In contradistinction thereto, the cylinder head gasket 1 according to the present invention, which is drawn with the solid line encloses only the coolant and/or lubricant channels 5, respectively, and then only by means of narrow strips of gasket material 4, which are combined into a one-piece gasket by means of bridge strips 6. Holes 3 for the passage of bolts are here disposed outside of the gasket 1 and need not be cut into the sealing material. To center the entire gasket 1, centering ridges 7 are provided which engage the seating sheaths, not shown, of the bolt passages 3. The cross-hatched sealing areas 17 are gasket portions not under sealing pressure which, merely for reasons of more economical fabrication, have not been cut out of the soft portion.

The combustion chamber 8 is sealed by a metal sealing ring 9. This ring is centered and held by three lugs 10 which extend from the soft portion of the gasket 1.

Figure 2:
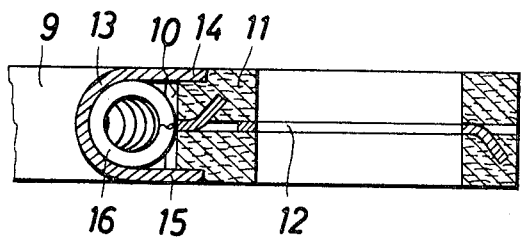
FIGURE 2 is a cross-sectional view taken along the plane defined by reference line 2—2 in FIGURE 1.

FIGURE 2 illustrates, in additional detail, the construction of gasket 1. This gasket consists of the soft portion 11 and a renforcing metal support 12. The lugs 10 which extend from the soft portion 11 and hold the combustion chamber seal 9 are compressed or pre-sealed in order to eliminate their influence on the sealing effectiveness. The purely metal sealing ring 9 consists of a sheath 13 having a C-shaped cross section and an annular helically-wound tension spring 16 is inserted between the arms 14, 15 of the sheath.

The entire sealing surface of the cylinder head gasket 1 according to the present invention is substantially smaller than the conventional gasket configuration 2 as can be seen in FIGURE 1. This sealing surface thus obtains significantly increased specific contact pressures without requiring that additional faces be applied to the compressing surfaces of the cylinder head and engine block.

We claim:

1. A cylinder head gasket for sealing the gap between the engine block and cylinder head of an internal combustion engine wherein the cylinder head contains at least one combustion chamber opening, a plurality of fluid passages for the flow of lubricant and/or coolant, and a pluarality of openings for receiving machine bolts for securing the cylinder head to the engine block, said cylinder head gasket comprising, in combination:

(a) at least one annular gasket sheath surrounding said cylinder head opening, said annular gasket sheath having a substantially C-shaped cross-sectional configuration;
(b) a spring member within said annular gasket sheath for rendering said sheath resilient in the direction in which compressional force is applied against said gasket by said cylinder head and said engine block; and
(c) a plurality of narrow gasket strips arranged to surround each of said fluid passages; and wherein said cylinder head gasket is shaped so that the area in the neighborhood of each of said openings for receiving machine bolts is substantially free of gasket material thereby to increase the compressive pressure on said gasket when said cylinder head is bolted to said engine block with said gasket positioned thereinbetween.

2. The cylinder head gasket defined in claim 1, wherein said plurality of narrow gasket strips are made of a relatively soft resilient material.

3. The cylinder head gasket defined in claim 1, wherein said annular sheath is made of a metallic material.

4. The cylinder head gasket defined in claim 1, said gasket further comprising at least one bridge strip connecting together said plurality of narrow gasket strips thereby forming a single unit of construction.

5. The cylinder head gasket defined in claim 2, said gasket further comprising a plurality of lug means made of said relatively soft resilient material protruding from at least one of said plurality of narrow gasket strips for holding and aligning said annular gasket sheath.

6. The cylinder head gasket defined in claim 5, wherein each of said plurality of lug means for holding and aligning said annular gasket sheath is precompressed.

7. The cylinder head gasket defined in claim 1, wherein said cylinder head and/or said engine block further includes openings though which fluid is not intended to flow between said cylinder head and said engine block, and said gasket further comprises at least one gasket portion covering at least one of said openings.

References Cited

UNITED STATES PATENTS

| | | | |
|---|---|---|---|
| 1,782,087 | 11/1930 | Bailey | 277—235 |
| 1,982,759 | 12/1934 | Rosen | 277—235 |
| 3,346,266 | 10/1967 | Bondroit | 277—153 |

LOUIS K. RIMRODT, *Primary Examiner.*

U.S. Cl. X.R.

277—235